United States Patent Office 3,284,316
Patented Nov. 8, 1966

3,284,316
STABLE PAPAIN DERIVATIVE
Theodore Cayle, Brooklyn, N.Y., assignor to Baxter Laboratories, Inc., Morton Grove, Ill., a corporation of Delaware
No Drawing. Filed Jan. 27, 1966, Ser. No. 523,242
6 Claims. (Cl. 195—63)

This case is a continuation-in-part of copending application Serial No. 311,314, filed September 25, 1963, now abandoned, which is a continuation-in-part of application Serial No. 104,225, filed April 20, 1961, now abandoned.

The present invention generally relates to a stabilized form of papain and more particularly to a zinc papain derivative. It further relates to a method of storing papain.

The papain of commerce is a complex of proteolytic enzymes derived from the tropical plant, Carica papaya. This enzyme system is gaining increasing importance where potent proteolytic activity is indicated. For example, papain is very successfully employed in the chillproofing of beer, the tenderizing of meats, and a number of other food processing and non food industries.

It has been the experience of those versed in the art of enzyme chemistry that the shelf life of many enzymes is inversely proportional to their degree of purity.

This has resulted in a problem of increasing magnitude as the requirements for more highly purified papain preparations have increased.

One of the factors associated with the instability of purified papain is concerned with the chemical nature of the primary proteolytic components of the system. These are sulfhydryl proteins, and enzyme activity requires the presence of these groups in the reduced form. It appears that loss of activity is associated with oxidation of these sulfhydryl groups, presumably to the disulfide. In addition, loss of activity may also be coincident with a degree of autodigestion of the papain protein. It was postulated that one of the methods by which the stabilization of purified papain could be accomplished was by chemically interferring with the ability of the sulfhydryl groups to oxidize, and also to inhibit the enzyme from digesting itself.

A stabilized crystalline papain was successfully made when the enzyme was crystallized as the mercury derivative (Kimmel et al. J. Biol. Chem. 207, 515; 1954). This type of product, however, has severe limitations with respect to its use as a food grade enzyme because of the toxicity of the metal and the high cost and low yield of the final product. The present invention is concerned with the formation of a stable metal derivative of the papain complex, zinc papain, suitable for human consumption, in quantities and yields allowing for successful commercial production.

In the past, zinc ions have been employed secondarily during the purification of papain (see Great Britain Patent 762,809 and U.S. Patent 2,950,227). These methods were only concerned with the purification of the enzyme and actually taught the removal of the metal ions by the inclusion of a stage of extended dialysis as a final step in the procedure. The resulting final product was essentially free of metal ions, highly active without exogenous activation, and stable for up to 14 days at 56° C.

It is an object of the present invention to provide a procedure whereby a stable nontoxic metal derivative of papain can be produced.

A further object of the invention is to provide a purified zinc papain which possesses a much improved stability over the purified papain of commerce.

A further object of the invention is to provide a process for the production of a purified stable zinc papain without resorting to costly methods of drying the final product. In the past, spray drying and lyophilization were employed to prevent drastic losses in the harvesting and drying of the unstable final product. In the present invention, the stable zinc papain can be harvested and dried in an ordinary tray drier at room temperature.

A still further object is to provide a novel method of storing papain without substantial loss of its proteolytic activity.

Other objects and advantages of the present invention will become apparent as the description proceeds.

It has now been unexpectedly discovered that a purified zinc papain, which is much more stable than known commercially available papain, may be obtained by treating an aqueous papain extract with zinc ions and isolating the purified and stable zinc papain compositions. The purified zinc papain is produced from an aqueous extract of the papaya latex, which extract includes any one of a number of typical sulfhydryl reagents, such as hydrogen sulfide, cysteine, sodium hydrosulfide, glutathione, etc. These reagents provide for the reduction of the sulfhydryl groups on the enzyme protein. The solids content of the extract to be tested is not critical, though the usual working range is 25–40%. This level may be obtained by concentrating the original extract in vacuo. The zinc chloride is then added to the concentrate in a concentration ranging from 270 to 300 milligram percent, based on solids. Larger amounts may, of course, be added but offer no advantage. In addition to zinc chloride, other zinc salts have been successfully employed, such as zinc sulfate and zinc acetate.

The zinc derivative of the protein may then be precipitated by adding cold methanol to a final concentration of 65%. The resulting precipitate is harvested by filtration or centrifugation, and the solids suspended in cold isopropanol, preferably about 90% to 99%. This suspension is filtered or centrifuged, the cake washed with isopropyl alcohol to remove the last traces of methanol, and the cake spread on a tray to dry. Drying can take place under conditions of standard pressure at room temperature, in the presence of a flow of air over the product, or in vacuo.

In the absence of exogenous activation the zinc papain derivative of the present invention only exhibits an activity of about 14%–18% of that exhibited by the fully activated material. A particular advantage is that upon exogenous activation there is a quantitative recovery of the activity potentially available in the product. Full and complete activation of the derivative may be obtained by treating the product in solution with a chelating agent such as ethylenediamine tetraacetic acid (EDTA) and a papain activator such as cysteine, or by allowing a solution of the enzyme to come in contact with naturally containing activating agents present in such materials as meat, beer and other biological materials.

In addition to providing upon reactivation for complete recovery of the proteolytic activity potentially available, the novel zinc derivative of the present invention is unexpectedly stable.

For example, after prolonged storage for periods up to and exceeding 10 months, it was found that the loss of activity was nominal, i.e. between 2–5% as compared to a 30–40% loss of activity with the purified papain of commerce.

The measure of proteolytic activity is assayed with a casein digestion method. With this method, one unit of papain activity is defined as that quantity of enzyme which will digest 1.25 gms. of Hammersten casein to the extent of 55% in one hour, at 40° C., as determined by Kjeldahl nitrogen measurement of a trichloroacetic acid filtrate of the digestion mixture.

The zinc content of the novel zinc papain derivative ranges from about 0.15% to 0.25%, depending on the purity of the enzyme protein, which, in turn, depends on the particular starting material employed.

As was previously stated, the proteolytic activity of the enzyme may be recovered by dissolving the zinc papain derivative in water and adding sufficient ethylenediamine tetraacetic acid (EDTA) or other suitable chelating agent to tie up the zinc ions and an amount of cysteine or a similar papain activator. It will be apparent to those skilled in the art that the exact amount of chelating agent and enzyme activator to be added depends on the zinc ion and the enzyme concentration respectively, and can be readily calculated.

The following examples are illustrative of satisfactory procedures for carrying out the invention and the advantages obtained thereby, and are not to be construed as indicating the limits of the invention.

Example I

To 400 gms. of a papaya latex extract with 25% solids was added 270 mgms. zinc chloride. 750 gms. of cold methanol was slowly added, with stirring, to a final methanol concentration of 65%. The resulting suspension was centrifuged and the precipitate was suspended in approximately 200 ml. of 91% isopropanol. This suspension was filtered and washed with approximately 100 ml. 91% isopropanol. The cake was spread in a dish and dried in vacuo.

The total number of papain activity units in the 400 gms. of the commercial papain starting material was 59,300. The white amorphous zinc papain powder obtained (60.9 gms.) has a zinc content of 0.24%. Upon reactivation with EDTA and cysteine it had a papain activity of 55,000 units for an enzyme yield of 93%, based on the starting material.

Example II

To 400 gms. of a papaya latex extract with 25% solids was added 270 mgms. zinc chloride. 750 gms. of cold methanol was slowly added, with stirring, to a final methanol concentration of 65%. The resulting suspension was filtered and the precipitate was suspended in approximately 200 ml. of 91% isopropanol. This suspension was filtered and washed with approximately 100 ml. 91% isopropanol. The cake was spread in a dish and dried at room temperature in a chemical hood. The zinc content of this material was 0.155%.

The total number of papain activity units in the 400 gms. of the commercial papain starting material was 62,500. The white amphorous zinc papain powder obtained (72.6 gms.) upon reactivation with EDTA and cysteine had a papain activity of 56,000 units corresponding to an enzyme yield of 90%, based on the starting material.

Example III

A comparison of the shelf stability of the zinc papain with that of the ordinary purified papain of commerce revealed a marked improvement of the former over the latter. In the following experiment, the preparation of Example I was employed as the source of zinc papain.

The zinc papain and the ordinary papain was diluted with lactose so that the proteolytic activity of each mixture was at the level typically encountered in pharmaceutical preparations, viz, 15 papain activity units per gram. The mixtures were placed in screw-capped jars, stored at room temperature, and assays made periodically with the casein digestion method.

The loss in activity encountered with the zinc papain over a period of ten months averaged between 2–5%, whereas the loss in activity of the purified papain of commerce was between 35–40%.

When other commercial papain compositions having about 55,000 to 65,000 papain activity units in 400 gms. of material are substituted for the commercial papain starting materials in the above examples, storage stable zinc papain derivatives substantially similar to those of the above examples are obtained.

It will be readily apparent that a variety of changes and modifications may be made without departing from the spirit and scope of the present invention.

What is claimed is:

1. A storage stable solid papain derivative comprising a white amphorous, solid zinc papain composition, said composition containing about 0.15% to 0.25% of zinc by weight, having a proteolytic activity of about 14%–18% of the activity potentially available upon exogenous activation, and being storage stable for long periods of time up to and over 10 months without substantial loss of proteolytic activity.

2. The method of preparing from a papain of relatively high proteolytic activity a stable papain derivative of relatively low proteolytic activity which can after long periods of storage be activated to yield a papain of relatively high proteolytic activity which comprises (a) dissolving a papain of relatively high proteolytic activity in an aqueous medium, (b) adding sufficient zinc ions to said solution to form a zinc papain derivative containing about 0.15% to 0.25% of zinc by weight and having a relatively low proteolytic activity of about 14%–18% of the activity potentially available upon exogenous activation, and then (c) removing said zinc papain derivative containing about 0.15% to 0.25% of zinc by weight and having a relatively low proteolytic activity of about 14%–18% of the activity potentially available upon exogenous activation in a dry stable form.

3. The method of storing papain without substantial loss in proteolytic activity which comprises (a) preparing an aqueous extract of papain, (b) adding to said extract zinc ions to form a zinc papain derivative containing about 0.15% to 0.25% of zinc by weight, and having a proteolytic activity of about 14%–18% of the activity potentially available upon exogenous activation, (c) removing said derivative in a dry form, (d) storing said derivative until time of use, and then (e) exogenously activating the zinc papain derivative to at least about 90% of its potentially available activity.

4. The method of claim 4 in which the exogenous activation comprises dissolving the zinc papain derivative in an aqueous media and adding a sufficient quantity of a chelating agent to inactivate the zinc ions and a sufficient quantity of a papain activator to obtain at least about 90% of its potentially available activity.

5. The method of claim 4 n which the chelating agent is ethylenediamine tetraacetic acid.

6. The method of claim 4 in which the papain activator is cysteine.

References Cited by the Examiner
UNITED STATES PATENTS 2,950,227 8/1960 Gibian et al. _____ 195—66
2,958,632 11/1960 Schwarz et al. _____ 195—68

A. LOUIS MONACELL, *Primary Examiner.*

L. M. SHAPIRO, *Assistant Examiner.*